Dec. 26, 1933.  A. L. KRONQUEST  1,941,033
MACHINE FOR CLOSING FILLED CANS
Filed July 27, 1931  14 Sheets-Sheet 1

Inventor
Alfred L. Kronquest
By
Sturtevant, Mason & Porter
Attorneys

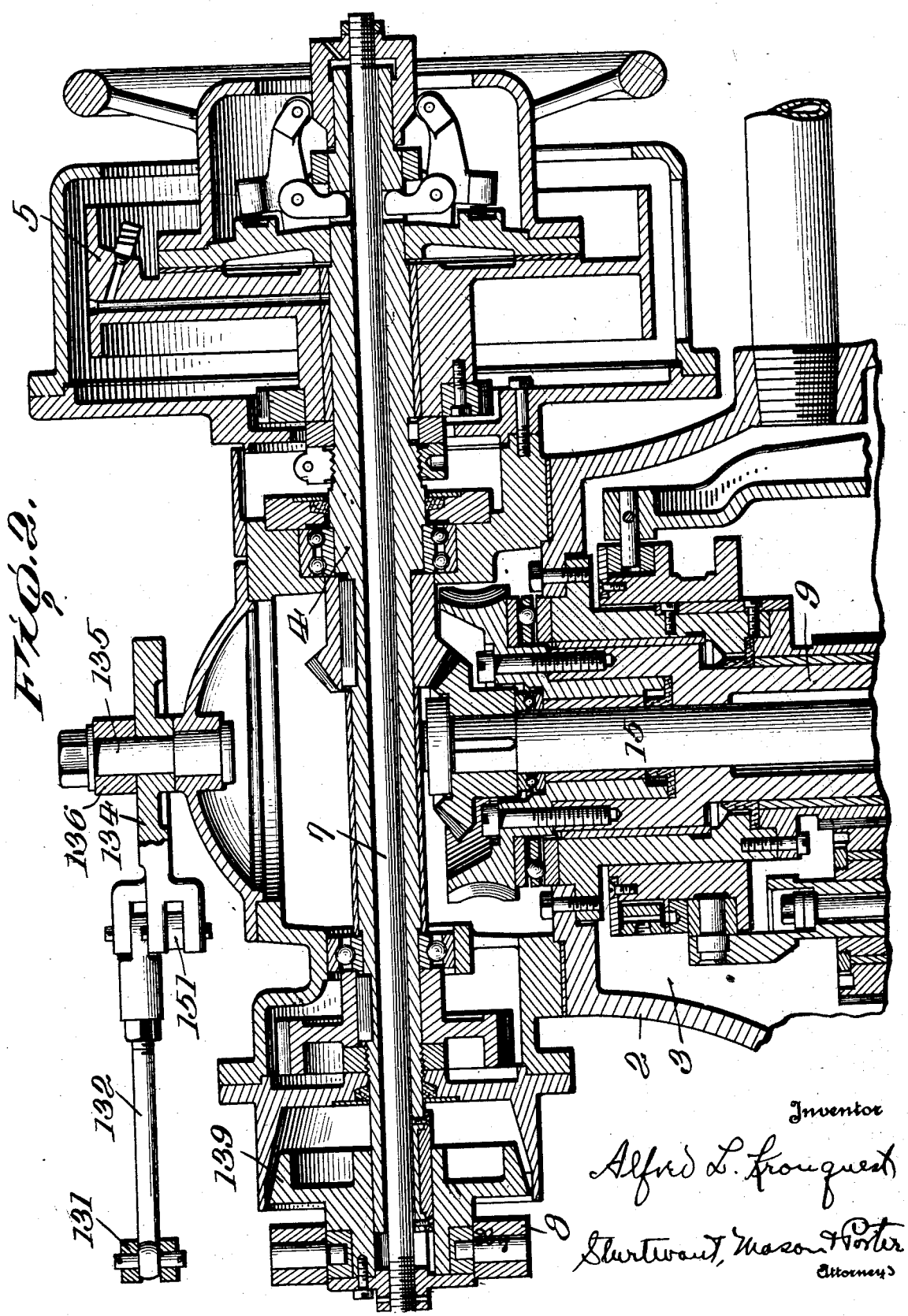

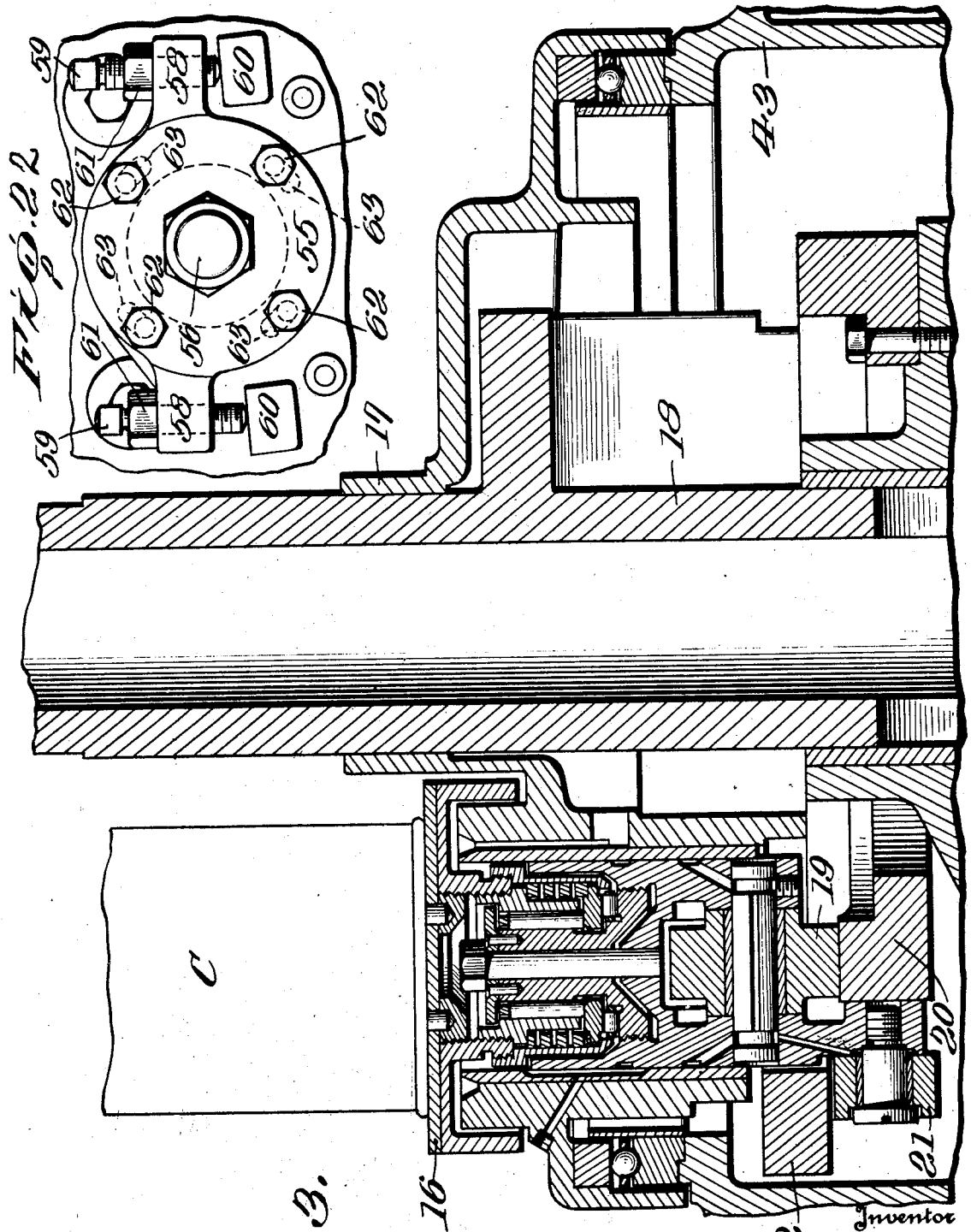

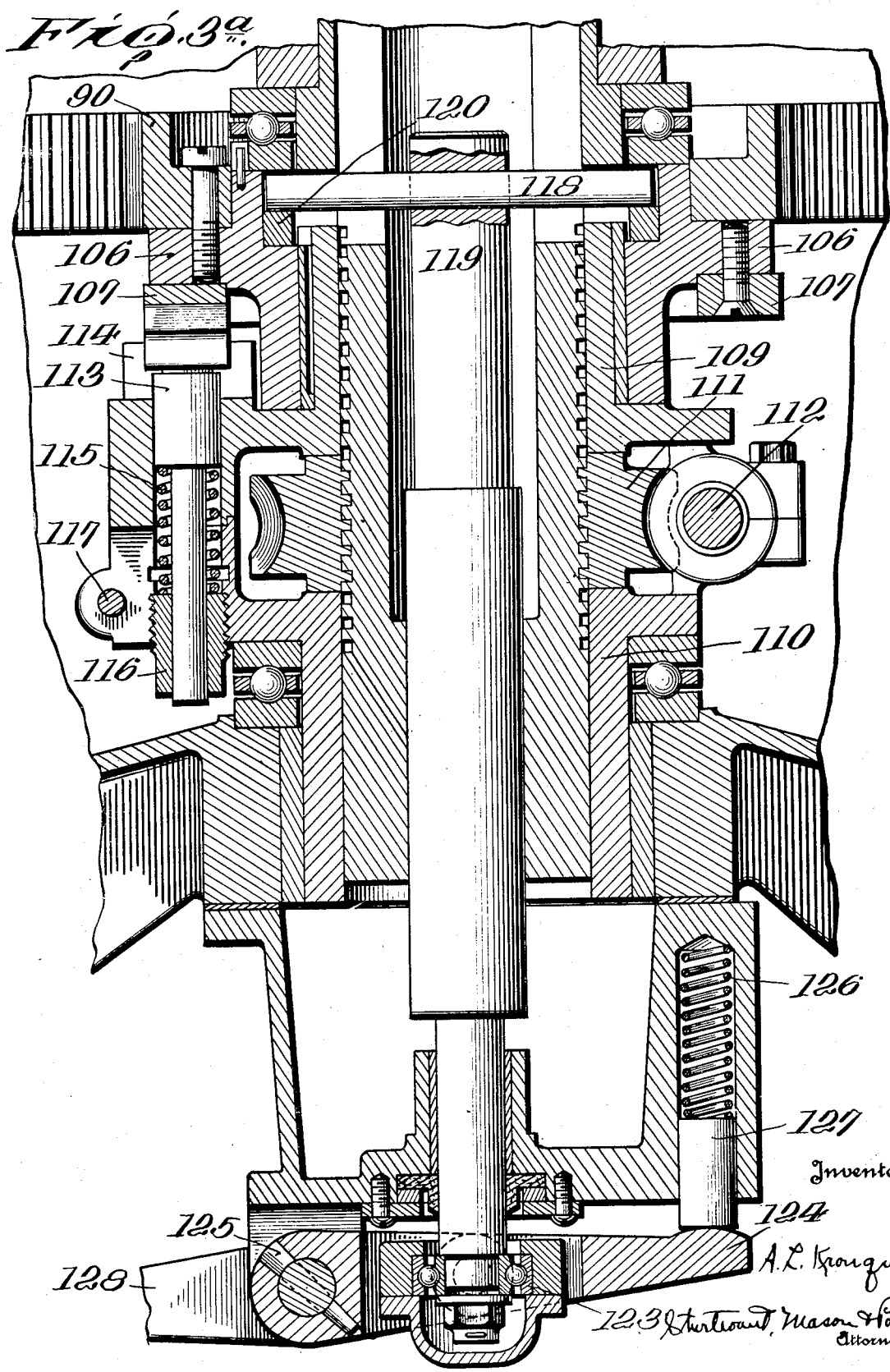

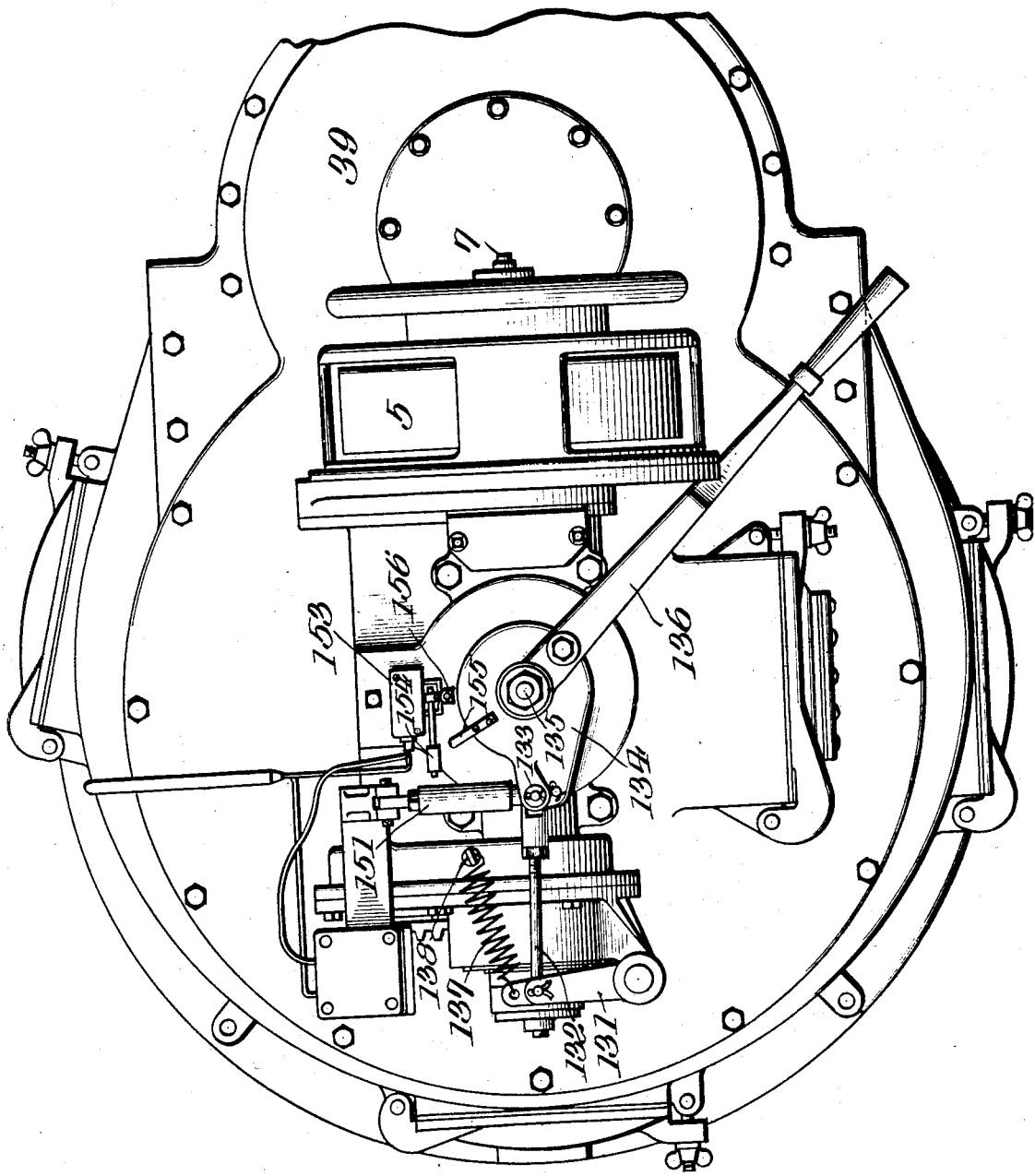

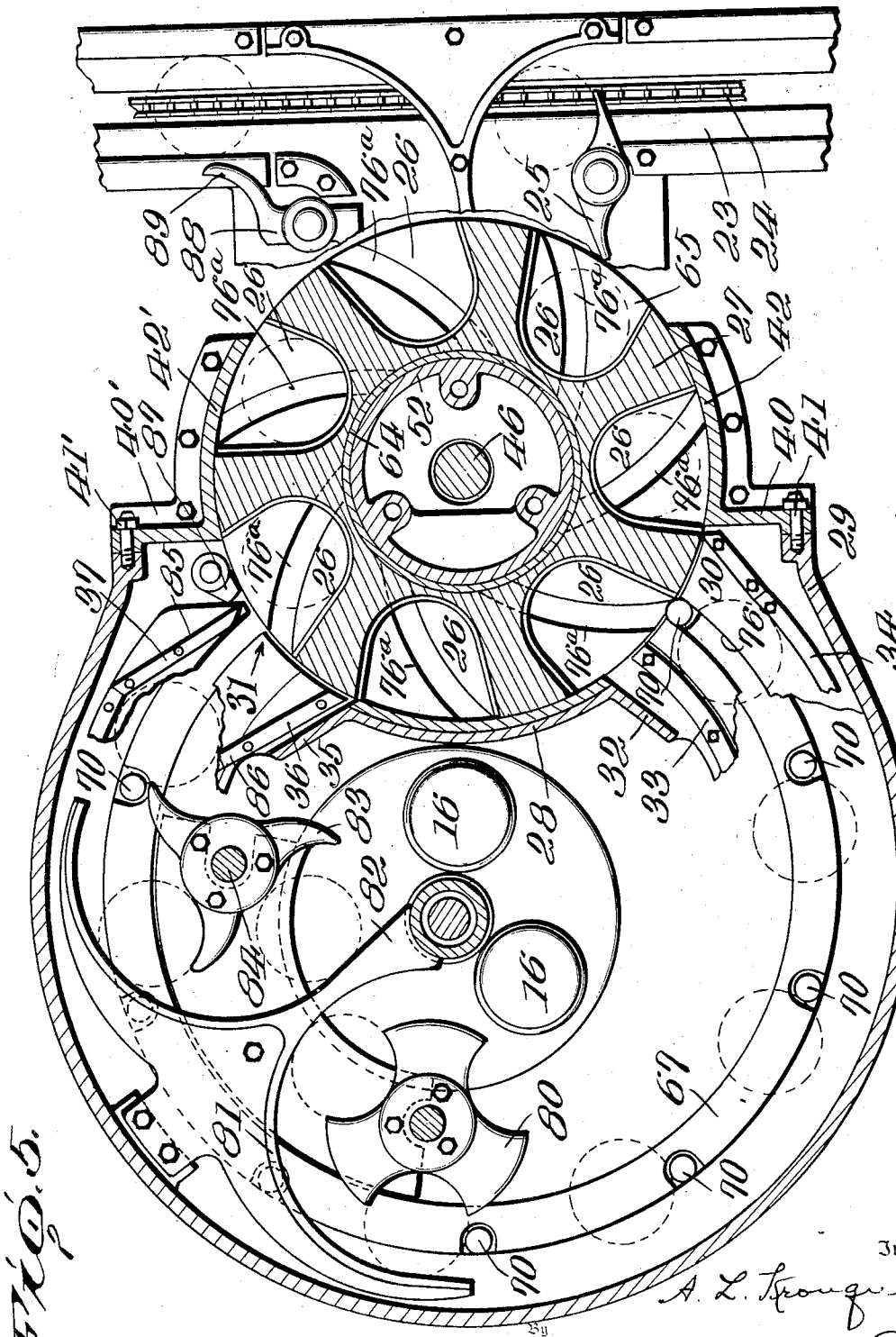

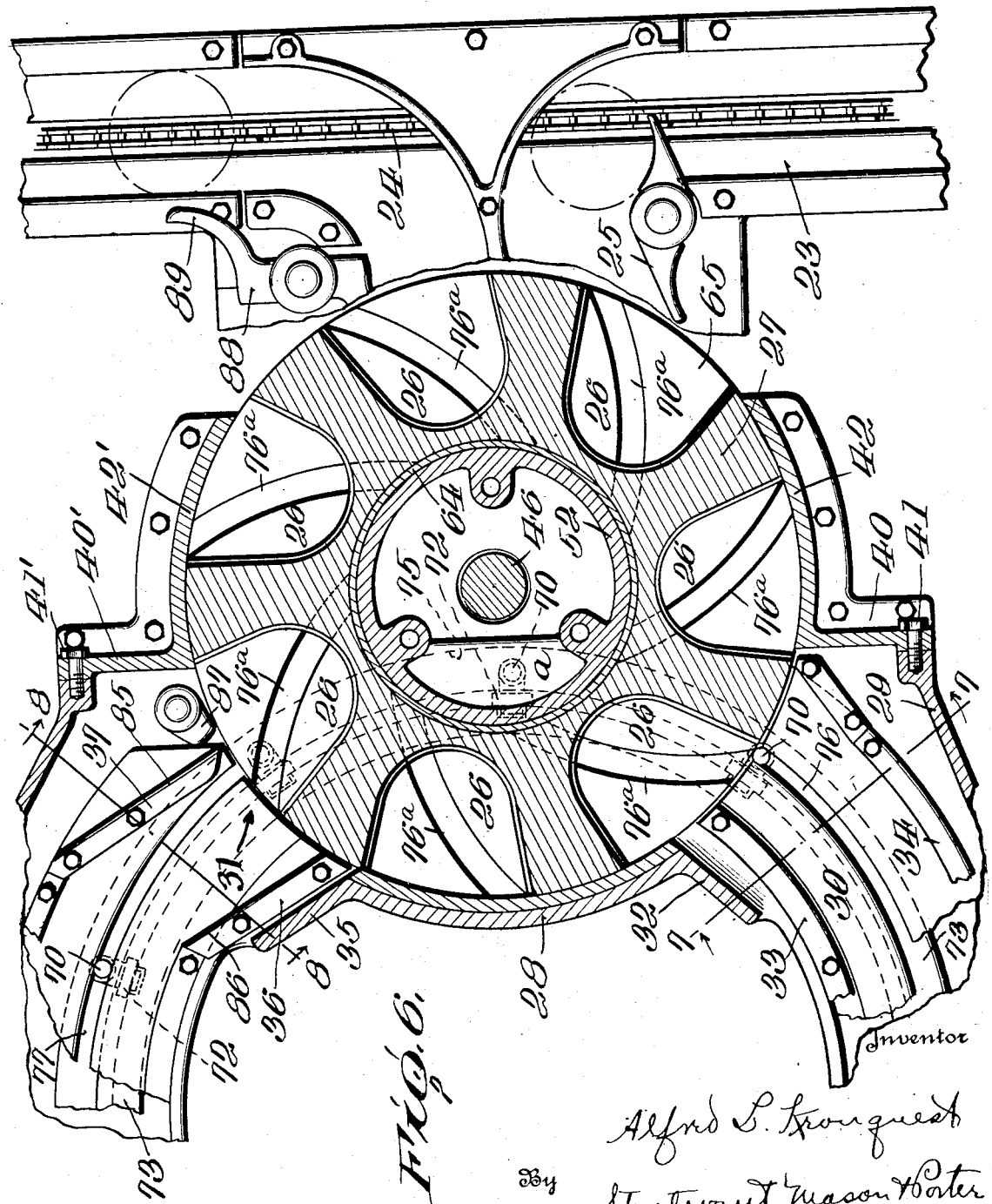

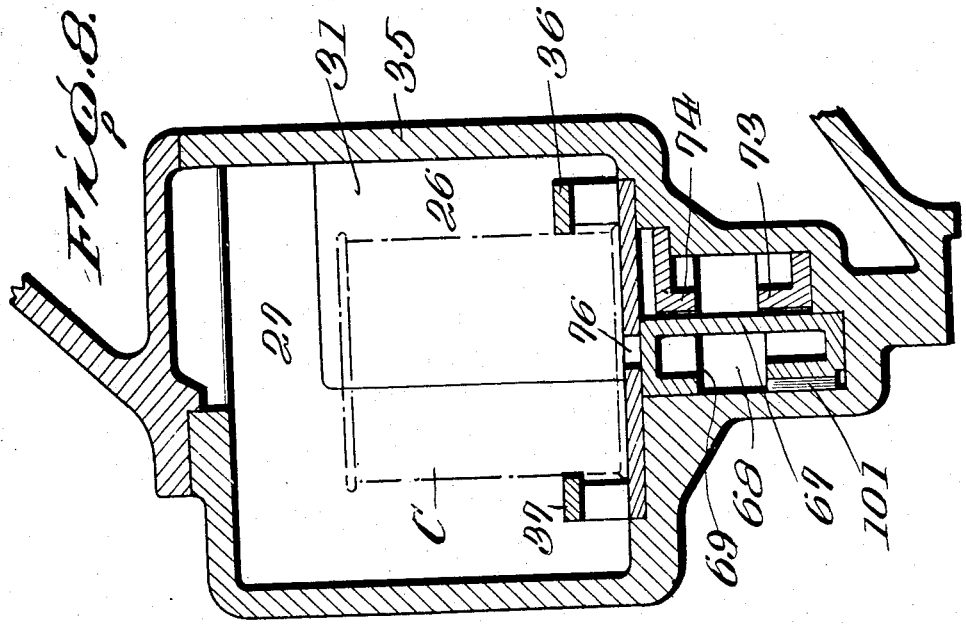
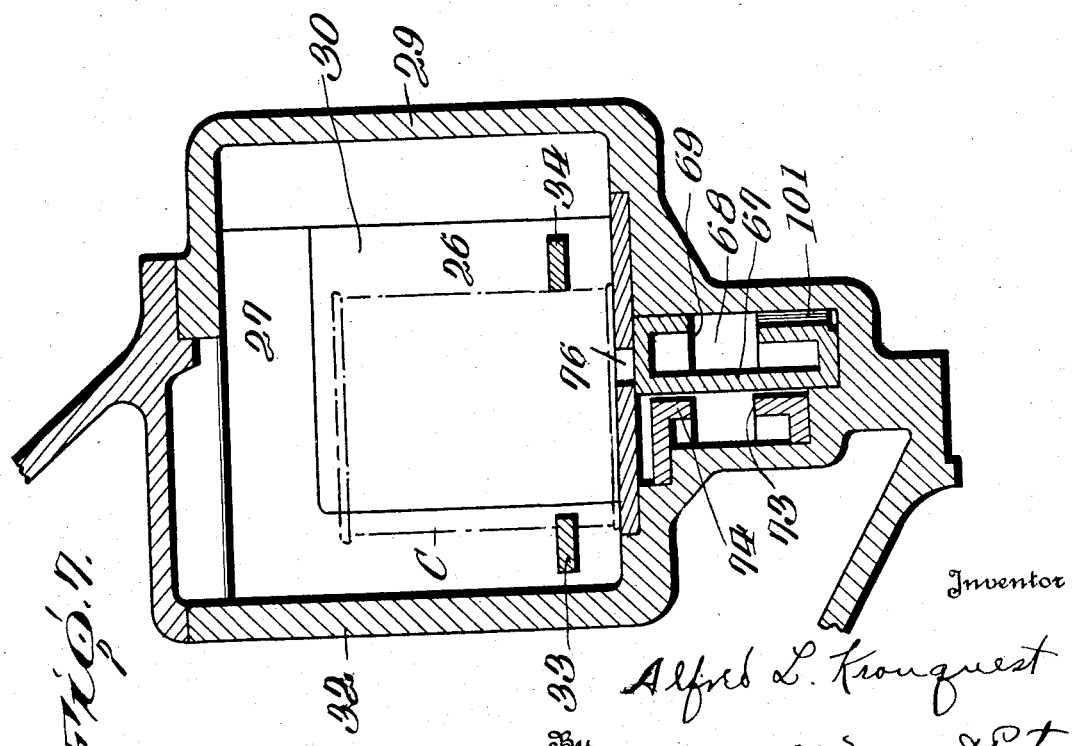

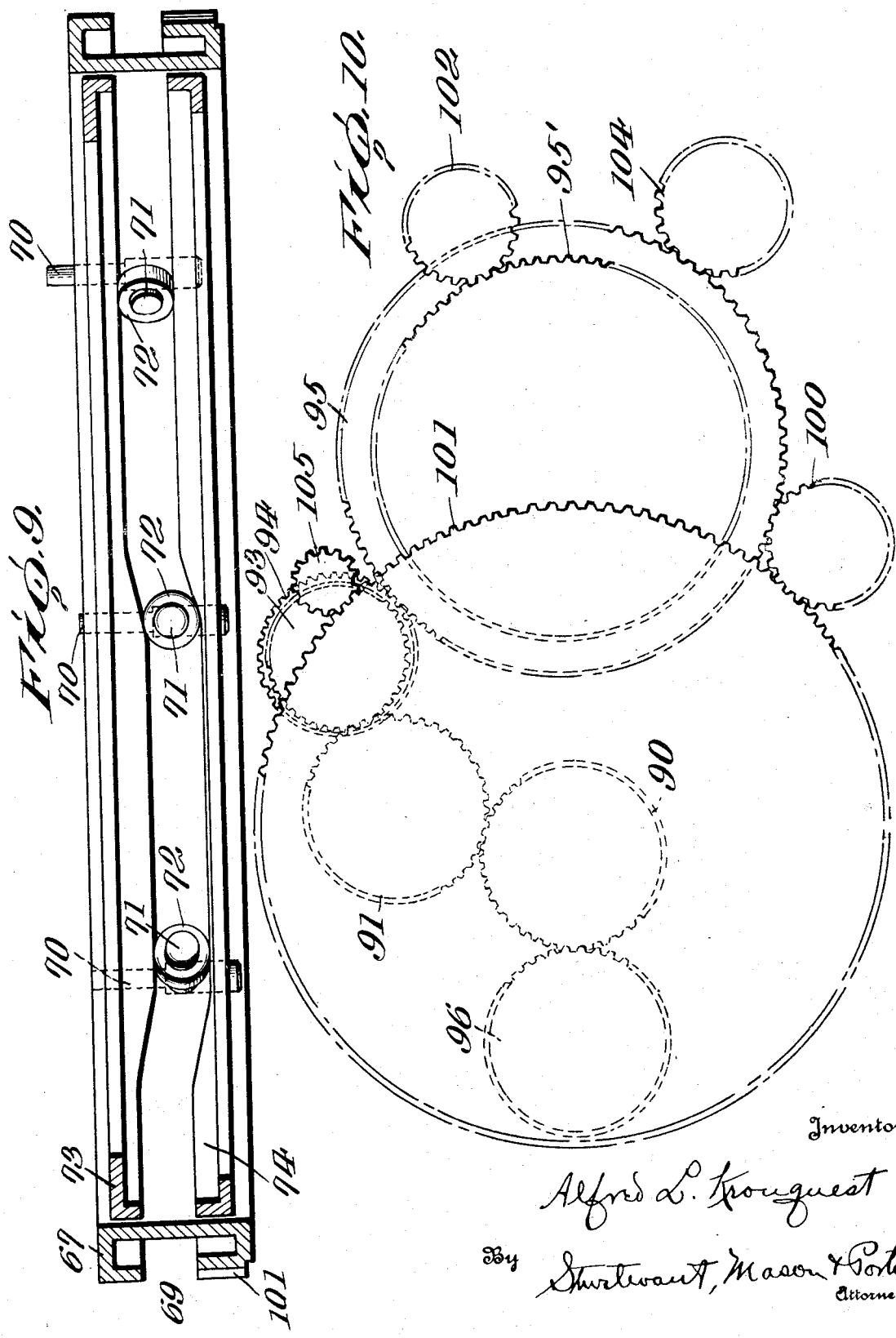

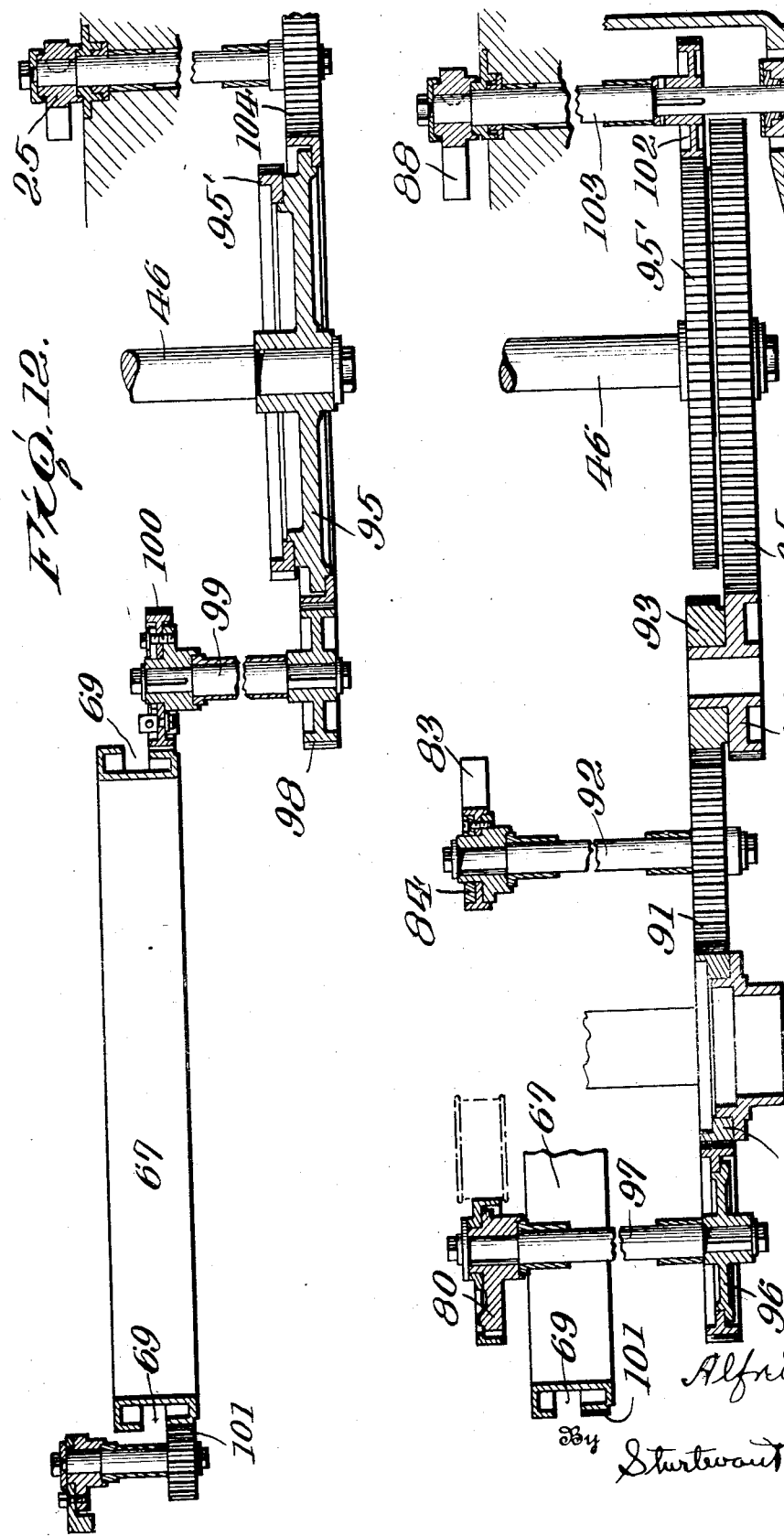

Dec. 26, 1933.   A. L. KRONQUEST   1,941,033
MACHINE FOR CLOSING FILLED CANS
Filed July 27, 1931   14 Sheets-Sheet 11
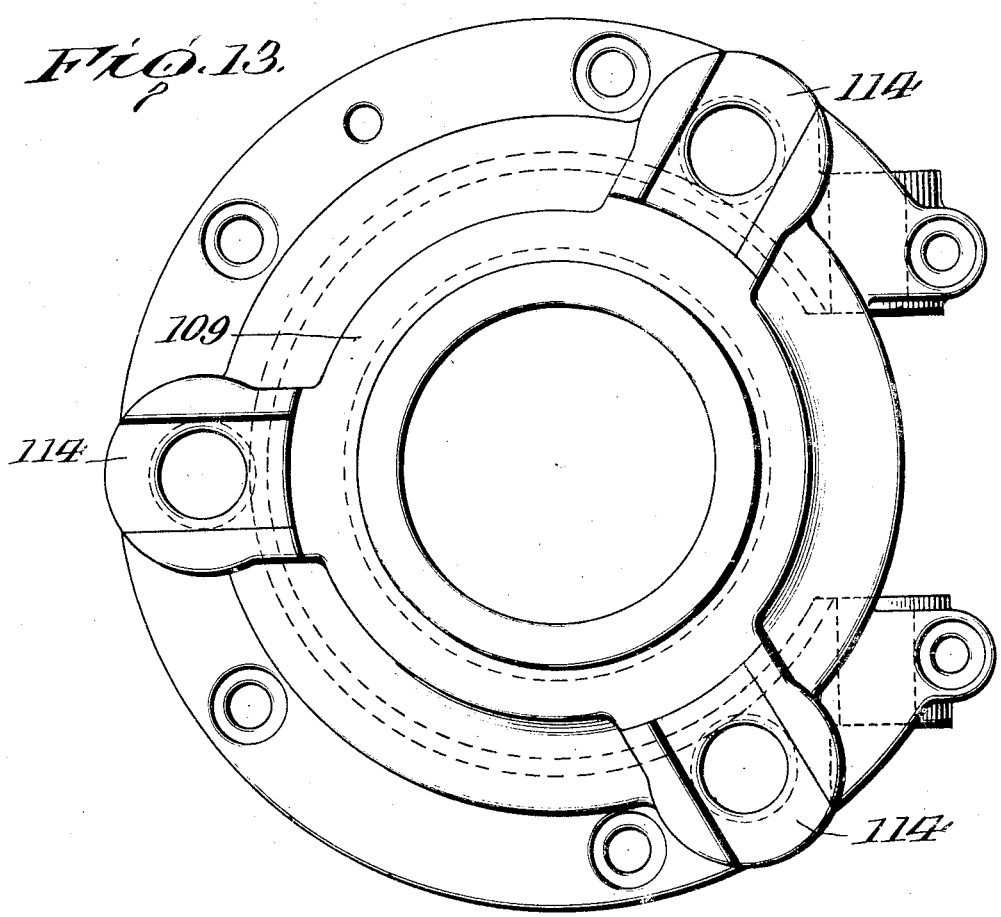
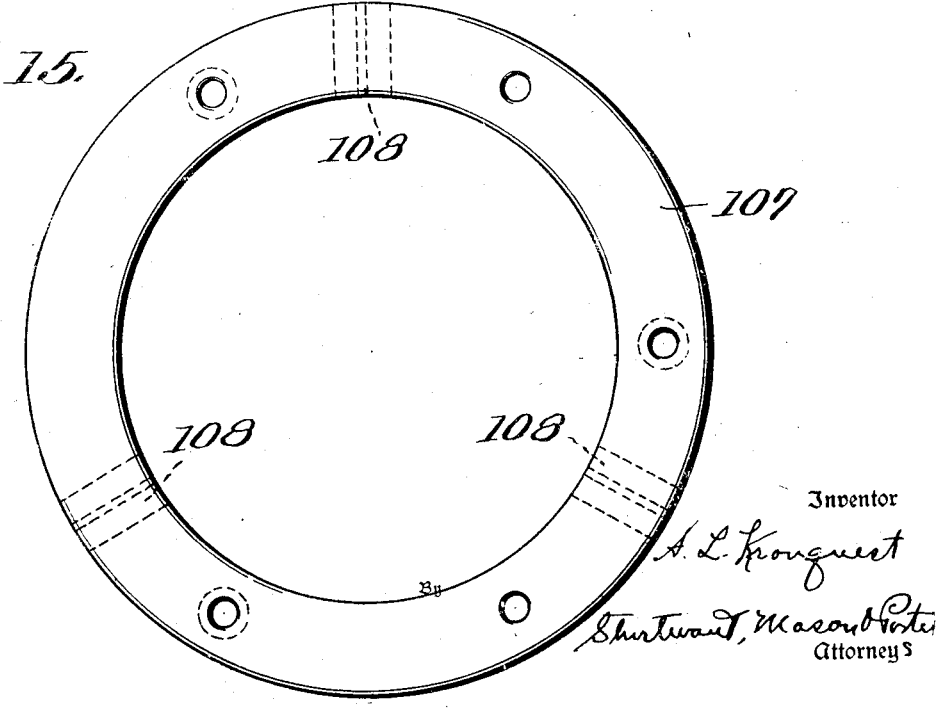

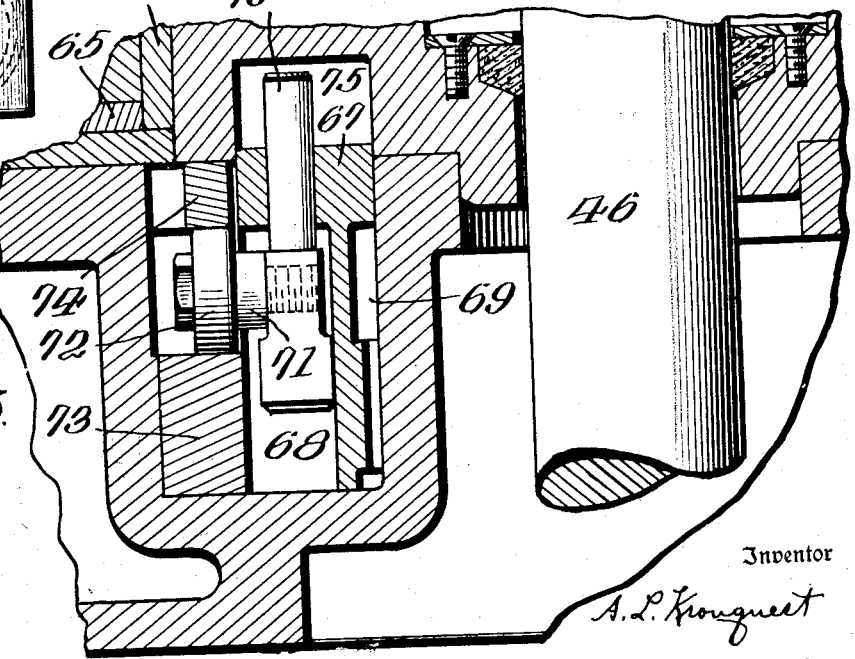

Dec. 26, 1933.  A. L. KRONQUEST  1,941,033
MACHINE FOR CLOSING FILLED CANS
Filed July 27, 1931  14 Sheets-Sheet 13
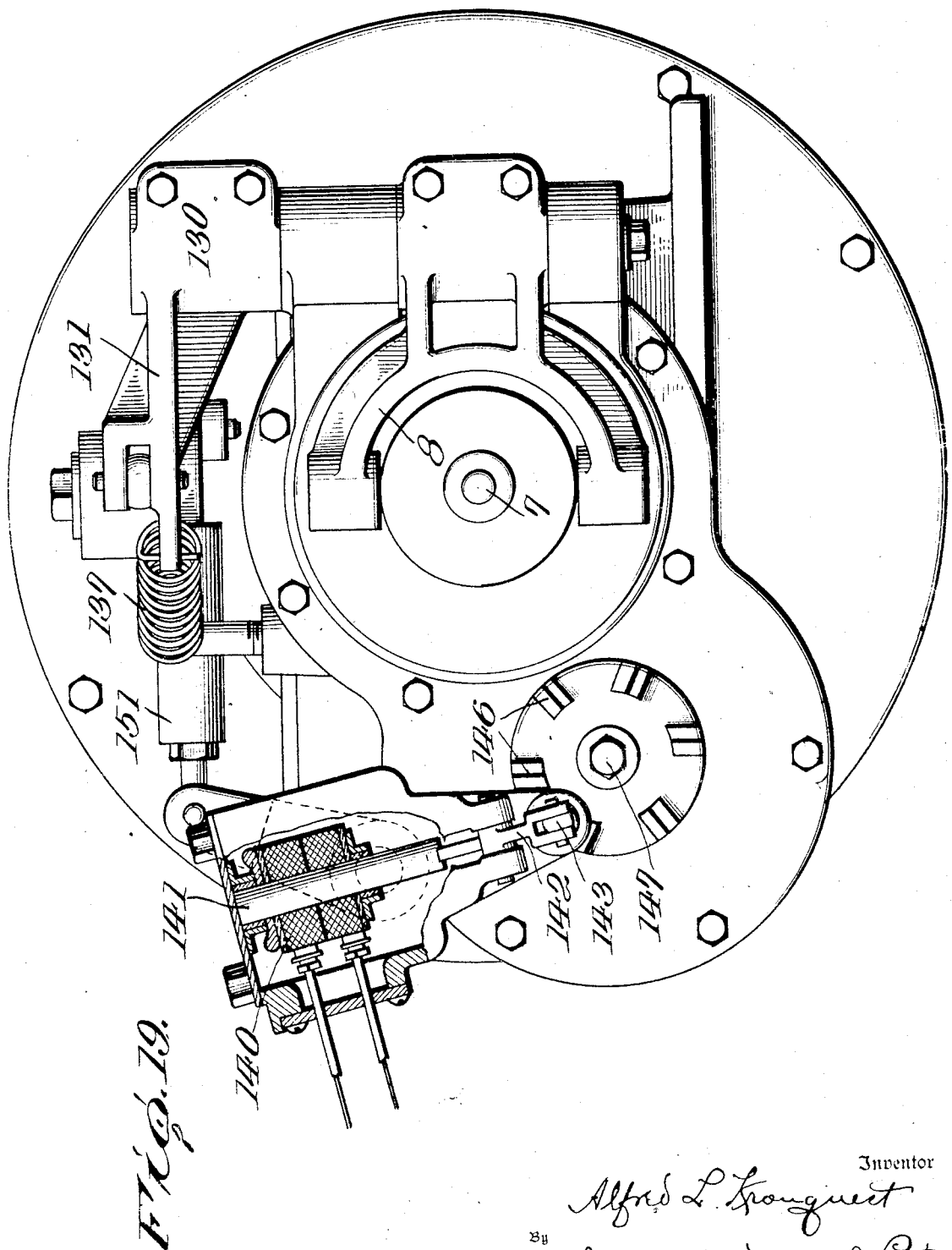

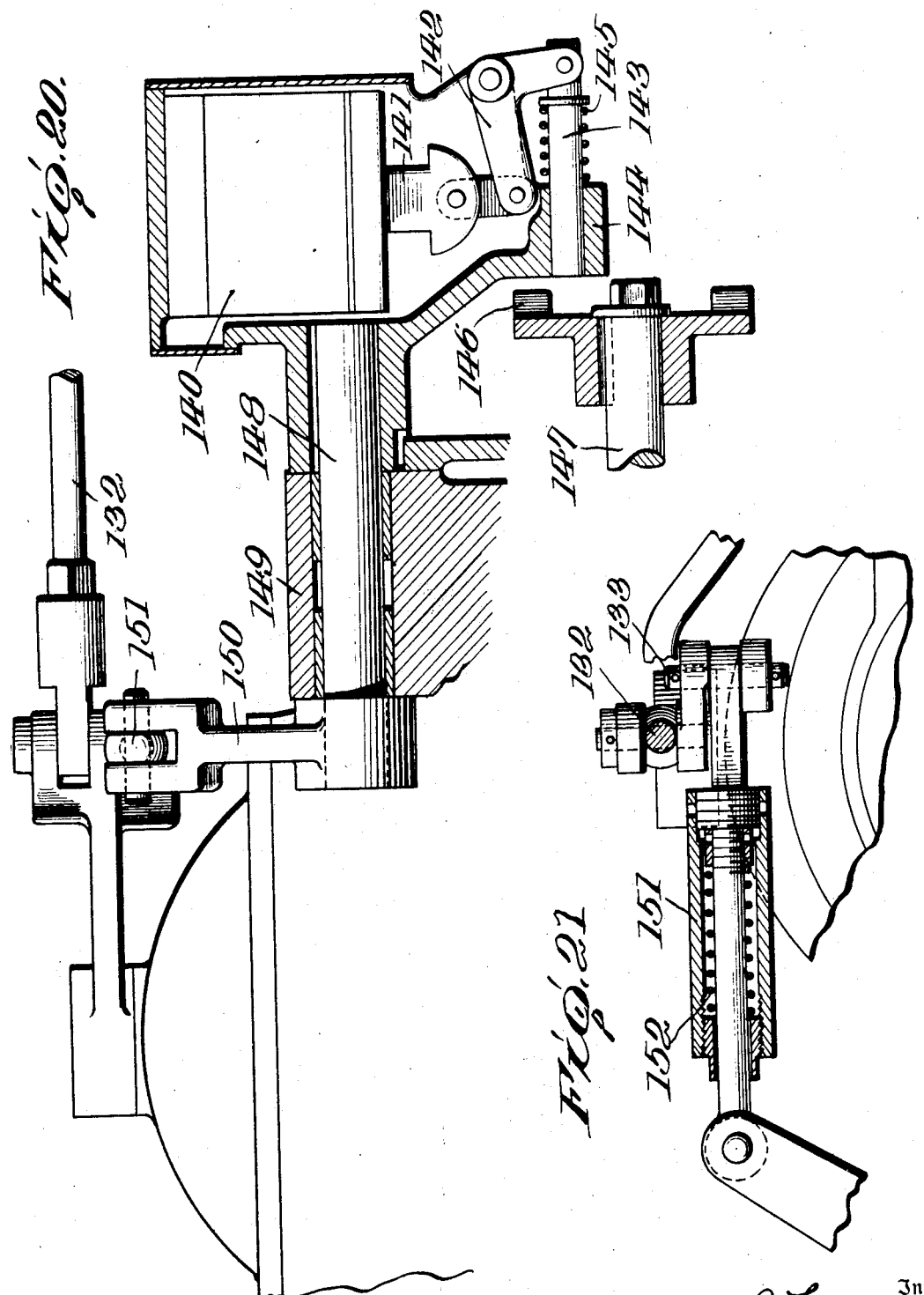

Patented Dec. 26, 1933

1,941,033

UNITED STATES PATENT OFFICE 1,941,033

MACHINE FOR CLOSING FILLED CANS

Alfred L. Kronquest, Syracuse, N. Y., assignor to Continental Can Company, Inc., New York, N. Y., a corporation of New York Application July 27, 1931. Serial No. 553,416

17 Claims. (Cl. 113—24)

The invention relates to new and useful improvements in a machine for closing filled cans, and more particularly to a machine wherein the closing end is attached to the can in a closed chamber which may be placed under vacuum, if desired.

An object of the invention is to provide a machine of the above type having independent openings, through one of which the cans are fed into the chamber and through the other of which they are discharged from the chamber, with a single pocket valve located outside of the chamber for controlling both openings.

A further object of the invention is to provide a machine of the above type with means which engages the can while in a pocket in the valve, and which operates to remove the can from the pocket, deliver the same to the closing unit, and which also receives the can from the closing unit and which delivers the same to a pocket in said valve.

A still further object of the invention is to provide a machine of the above type wherein the pocket valve controls the opening leading to the chamber where the ends are attached to the can bodies, and wherein a traveling member moving about the center of the chamber as an axis also moves beneath the pocket valve and is provided with devices which are operated so as to engage and remove the cans from the pockets in the valve one after another.

A still further object of the invention is to provide a machine of the above type wherein the means for rotating the valve, operating the conveying member, and also for operating the devices which engage and move the cans into and out of the valve, and from and on to the conveying member, are driven from a driving gear through devices yieldingly connected and adapted to move relative to each other, in case of a jam, for automatically stopping the machine.

A still further object of the invention is to provide a machine of the above type wherein the devices which move relative to each other for stopping the machine, may be brought back into proper timing for the parts actuated thereby, after the jam is released and the machine again started.

These and other objects will in part be obvious and will in part be hereinafter more fully disclosed.

In the drawings which show by way of illustration one embodiment of the invention—

Fig. 2 is a similar view, on a larger scale, of the extreme upper porton of the machine;

Fig. 3 is a vertical sectional view through the lower turret and the central sleeve;

Figure 1:
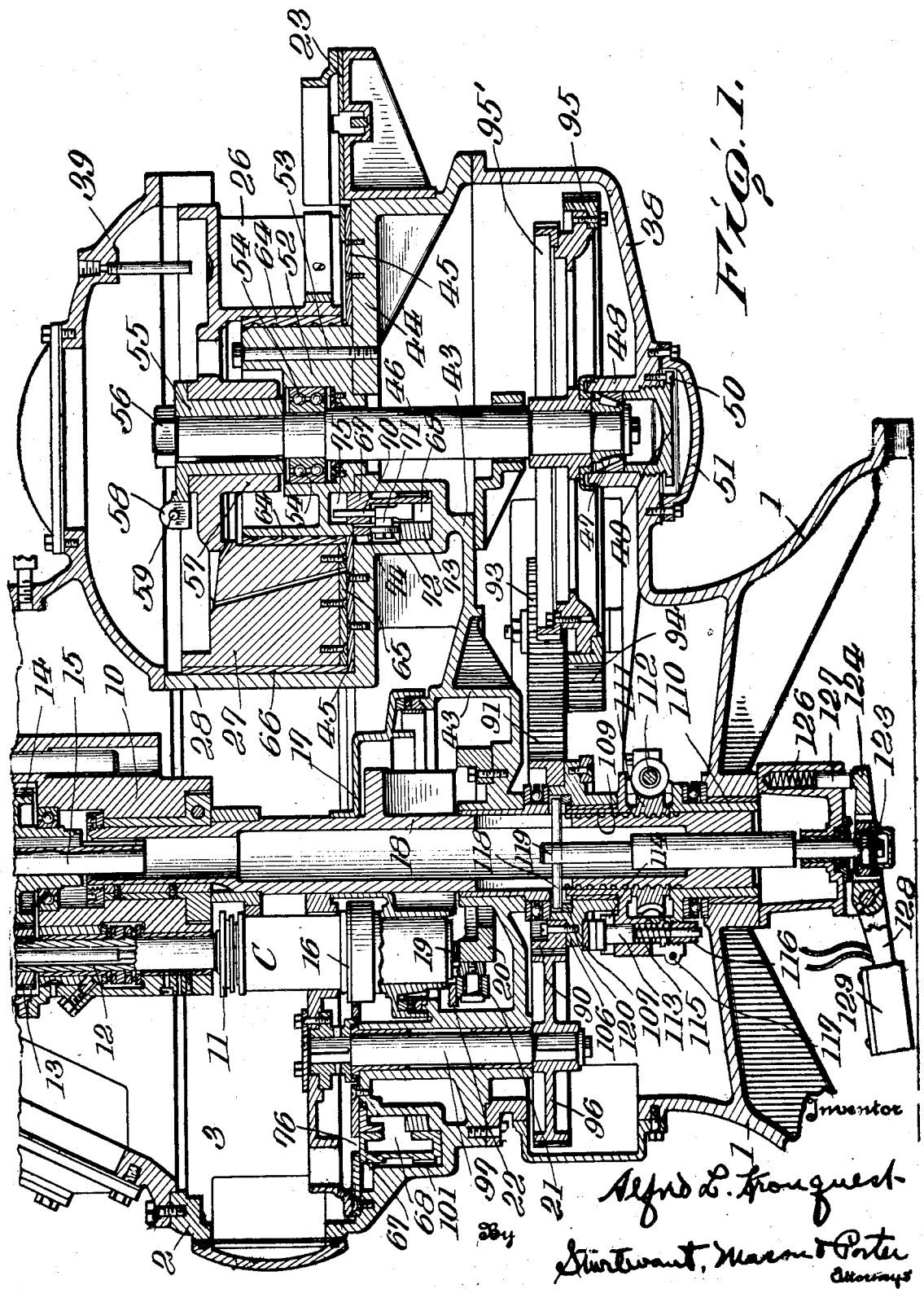
Figure 1 is a vertical sectional view through a portion of a machine embodying the invention.

Fig. 3ª is an enlarged vertical sectional view through the central portion of a closing machine and showing the driving mechanism for the conveying devices and the automatic means for stopping the machine in case of a jam;

Fig. 4 is a top plan view of a portion of the machine;

Fig. 5 is a view showing more or less diagrammatically partly in plan and partly in section, the devices for moving the cans and their path of travel through the machine;

Fig. 6 is a horizontal sectional view through the pocket valve and a portion of the casing, showing the relation of the traveling devices to the pocket valve which remove the cans from the pockets for closing, and which place the cans in the pockets after they are closed;

Fig. 7 is a sectional view through the valve on the line 7—7 of Fig. 6;

Fig. 8 is a sectional view on the line 8—8 of Fig. 6;

Fig. 9 is a sectional view through the traveling ring carrying the pins which move the cans from the pockets and delivers the cans to the pockets after they are closed;

Fig. 10 is a diagrammatic view showing the manner of driving the members which move the cans from a common driving gear;

Fig. 11 is a view showing more or less diagrammatically the train of operating gears for actuating the valve, the devices which transfer the cans to and from the seaming station, and the device which transfers the cans from the valve after they are closed;

Fig. 12 is a view showing more or less diagrammatically the means for operating the traveling ring carrying the can conveying pins, also the means for insuring the placing of the closed can in the pocket, and means for placing the cans which are to be closed in the pockets of the valve;

Fig. 13 is a plan view of the upper half of the shifting worm housing;

Fig. 14 shows in side and end views one of the safety latch pins;

Fig. 15 is a plan view of the ring with which the safety latch pins cooperate;

Fig. 16 is a sectional view through the ring;

Fig. 17 is a plan view of the cam ring which controls the shiftable stop lever;

Fig. 18 is a sectional view of the same showing in full lines the normal position of the control bar, and in broken lines the position of the control bar when the lever is shifted for stopping the machine;

Fig. 19 is a side view of a portion of the machine showing the clutch shifting devices controlled by the stop lever;

Fig. 20 is a view in section showing the electrically controlled automatic stopping mechanism;

Fig. 21 is a detail in section of the shock absorbing link intermediate the automatic stopping mechanism and the manually controlled stopping mechanism;

Fig. 22 is a top plan view of the upper end of the valve and showing the means for connecting and timing the same to the driving sleeve, and Fig. 23 is an enlarged section through the floor and valve showing the conveying ring and pins associated therewith, with the pins raised.

The invention is directed to a machine for closing filled cans, and is designed particularly for closing the cans in a vacuum chamber. The machine includes a main supporting frame which is provided with a casing forming a closed chamber in which is located the devices for attaching an end to a can body. There are two independent openings leading to this chamber, through one of which the cans are fed into the chamber, and through the other of which they are delivered from the chamber after they are closed. A single valve cooperates with both openings, closing these openings, so that the chamber is closed to the outer atmosphere and can be placed under vacuum. The valve is provided with pockets which receive the cans and convey the same to a point where they may be removed from the pocket into the chamber and then passed to the closing means, after which they are delivered again to a pocket in the valve and thus carried from the chamber. The means for closing the cans may be of any well-known type. As shown, it is of the type wherein the end is secured to the can body by double seaming. The cans are removed from the pockets by a traveling ring carrying a series of pins. This ring rotates about the center of a vacuum chamber and the pins travel in a slot formed in the supporting table for the cans. The pins are cam controlled and are raised so as to engage behind the can while it is in the pocket, moving the can from the pocket to the transfer mechanism which takes the can into the seaming unit. After it is closed, the can is then delivered in front of a pin on the traveling ring which places the can in a pocket in the valve. The valve, the traveling ring and the devices which place the can in the valve, and remove the cans from the valve, and also the devices which remove the cans from the traveling ring, and again place the cans on the traveling ring after the closing operation, are all driven from a common driving gear. A driven operating member is connected to the ring by yielding latches. In case of a jam at any place in the can moving parts operated by the driving gear, the latching devices will be forced from driving connection with the ring and the operating member will continue to move until the machine is stopped. During this relative movement between the gear and the operating member, a control cam moves a control bar which in turn permits a stop lever to shift and close an electric switch whereby a mechanism is set into action which stops the machine. When the jam has been removed and the machine again started, all that is necessary is to shift the clutch to start the machine, and the latching devices will again engage and take up the actuation of the ring in proper timing of the parts operated thereby.

The invention will be better understood by a detail description of the illustrated embodiment thereof. In the drawings, the supporting base of the machine is indicated at 1. On this supporting base is mounted a frame, which includes a casing 2 shaped so as to provide a chamber 3 which is a closed chamber, and it is in this chamber that the ends are attached to the can bodies. Many of the features of the machine, and in particular, the seaming mechanism and the operation of the seaming mechanism from the main actuating shaft, are shown and described in detail in U. S. Patent No. 1,752,912, granted A. L. Kronquest, April 1, 1930. Only a brief reference, therefore, will be made to the seaming mechanism and the actuating parts therefor. Located at the upper end of the machine is a main driving shaft 4 which is operated from a belt wheel 5 through a clutch mechanism 6. The clutch mechanism is shifted by a rod 7 which in turn is operated by a lever 8. Located centrally of the main housing of the machine and centrally of the closed chamber 3 is a driving sleeve 9 which is actuated through the worm connection from the shaft 4. This driving sleeve is connected to the upper turret 10 in which is mounted the rotating chucks 11 of each seaming unit. Each chuck is carried by a sleeve 12 to which a gear 13 is attached, and this gear 13 meshes with a gear 14 attached to a shaft 15 carrying a bevel gear at the upper end which meshes with a bevel gear on the main driving shaft.

Associated with each seaming chuck are seaming rolls, not shown in the drawings, which join the end of the can to the can body. The can bodies are indicated at C in the drawings. The can bodies rest on supports 16 during the seaming operation. There is a support for each seaming unit, and these supports are mounted in the lower turret 17 which is attached to a sleeve 18, and this sleeve 18 has a splined connection with the upper turret. The supports 16 are raised by means of rollers 19 which travel on stationary cams 20. These supports are positively lowered by rollers 21 which travel on the stationary cam 22. When the cans are placed on these supports they are raised so that the end engages the chuck, and the cans are rotated while the seaming rolls perform their seaming operation.

The manner of delivering the cans to and from the machine will now be described. Each can has its end loosely attached thereto when it is fed into the machine. The cans are conveyed along a supporting table 23 by a conveyor 24, and are removed from the conveyor by a rotating arm 25 which places the can to be closed in a pocket 26 of a valve 27. The wall 28 of the casing is spaced away from the wall 29 of the casing so as to provide an opening 30 through which the cans pass into the chamber 3. It also provides an opening 31 through which the cans are passed from the chamber after the ends have been seamed thereto. This wall 28 has its outer face curved about the axis of rotation of the valve 27. Said wall has an extension 32 at the receiving side thereof carrying a guide rail 33 which cooperates with a guide rail 34 in directing the cans as they are conveyed through the opening 30 into the chamber 3. The wall 28 has an extension 35 carrying a guide rail 36 associated with a guide rail 37 for directing the cans through the opening 31 after they are closed into the pockets of the valve.

The valve is mounted in an extension of the main casing. The lower member of this extension is indicated at 38 and the upper member at 39. Between the upper and lower members is a plate 40 secured to the main casing by suitable bolts 41, 41. This plate is provided with an extension 42 having a curved wall conforming to the outer face of the valve. There is a similar plate 40' at the other side of the machine secured to the casing by bolts 41', and having an extension 42', the inner face of which is curved to conform to the face of the valve. Extending all the way across the machine is a frame member 43. The sleeve 18 is mounted for rotation in this frame member. In the region of the valve, this frame member 43 is provided with a floor member 44 carrying a wear plate 45. Extending upwardly from this floor member 44 is the wall 28 which separates the openings 30 and 31. The valve 27 is mounted for rotation above this supporting plate 45. It is carried by a shaft 46 which is supported in the roller bearing 47 at its lower end. The roller bearing is mounted in a sleeve 48 and rests on an adjustable nut 49 which is held in a set position by a screw 50. A cap plate 51 covers this adjustable nut 49. When the nut is turned, the shaft 46 may be raised or lowered, depending upon which way it is turned. The floor member 44 carries a bracket sleeve 52 which is secured thereto by bolts 53. Mounted in this bracket sleeve 52 is a ball bearing 54 for this shaft 46. Keyed to the shaft is a sleeve 55, and on top of the sleeve 55 is a retaining nut 56. The valve 27 is provided with a sleeve 57 which engages over the sleeve 55. The sleeve 55 has radially projecting arms 58, 58 carrying adjustable bolts 59, 59, which bear against lugs 60, 60 carried by the valve 27. By turning in one of the bolts 59 and turning out the other, the valve may be shifted angularly on the supporting sleeve 55. Lock nuts 61 serve to secure the bolts 59 in adjusted position. Locking bolts 62 passing through slots 63 in the sleeve 55 are threaded into the sleeve 57 and serve to secure the two sleeves in a set position.

The valve 27 is recessed and fits over the sleeve 52. Between the valve 27 and the sleeve 52 is a wear plate 64 turning with the valve. Also between the valve 27 and the supporting plate 45 is a wear plate 65 secured to the valve. Ports are provided so that a film of lubricating oil is maintained between these wear plates and the parts adjacent the same, and this oil film serves to seal the valve and prevent air from passing through the valve into the chamber 3. There is also a wear plate 66 between the outer face of the valve and the casing which is stationary and between which is an oil film for sealing the valve. The valve turns about a fixed axis and has no lateral movement incident to the pull of the vacuum chamber thereon. The wear plate 65 extends across the pockets 26 in the valve 27 and serves as a carrying member for the can which when moved into the pocket is placed on this supporting plate 65.

The cans are removed from the pockets of the valve by a traveling ring conveyor 67. This ring conveyor is mounted for rotation about the center of the chamber 3. The frame of the machine is provided with a channel 68 (see Figs. 1 and 23) in which this ring moves. The ring is cut away centrally thereof, and on its outer face as indicated at 69. At spaced intervals, the ring is provided with pins 70 mounted for vertical reciprocation. Each pin carries a stud 71 on which is mounted a roller 72. The rollers 72 engage stationary cams 73 and 74 which are carried by the frame and spaced from each other so as to form a cam track for the rollers 72. The purpose of this cam track is to lower the pins at a certain time in the travel of the same, as will be more fully hereinafter described.

The floor member 44 is also provided with a channel 68 which connects with the channel in the frame of the machine beneath the can support in the vacuum chamber. This channel is circular and the center thereof is at the center of the axis of rotation of the seaming unit. There is a slot 76 extending through the can support in the vacuum chamber and communicating with the channel 68. The sleeve 52 is formed with a recess 75 which provides a clearance space for the pins 70 when raised through the action of the cams thereon. The wear plate 65 which is secured to the valve and traveling therewith, is provided with slots 76ᵃ. When one of the pins reaches the position a in Fig. 6, it is fully raised and is moving along the recess 75 in the center sleeve on which the valve 27 rotates. As the pin 70 reaches the inner face of the valve, the slot 76ᵃ in the supporting plate 65 is presented thereto so that the pin moves into this slot. The slot is curved so that the pin which is traveling about the center of the chamber 3 will have a free movement along the slot, although the valve is turning about a different center. As the pin passes into the pocket of the valve, it will engage the can and will force the can out of the pocket through the opening 30 and along the can support within the vacuum chamber 3. The supporting table, as noted, is provided with a slot 76 along which the pins travel. There is, of course, a pin which comes into action for each valve pocket, and the pins convey the cans from the pockets into the chamber 3 and to the transfer device 80 for delivering cans to the seaming mechanism. Associated with this transfer device 80 is a guide rail 81. The transfer device 80 is preferably in the form of half molds, and the can is transferred from in front of a pin on to the traveling can support of the seaming unit. As shown in the drawings, there are three seaming units. At each seaming unit, the can is chucked and rotated, and the seaming rolls come into operation for double seaming the end to the can body. The can is then discharged from the seaming unit by a contact of the can with the guide rail 82 which directs the can into range of the traveling arms 83 carried by the discharge turret 84. These arms 83 move the cans along the guide rail 82 which is so curved as to direct the cans in front of a traveling pin 70 which will then take the can to the opening 31 and place the can in a pocket in the valve 27. Guide rails 85 and 86 direct the can so that the pin places the can in the pocket. The pin is caused to be lowered by the stationary cam operating thereon, and drops beneath the table just as it passes underneath the valve. The pin remains depressed until the point a is reached, when it is raised so as to become active in taking the can out of the pocket. There is a rotating arm 87 which is timed so as to engage the can and crowd it back into the pocket. This arm may be otherwise shaped and other means may be utilized for positively controlling the can and forcing the same into the pocket.

There is a rotating take-away turret 88 having arms 89, 89 which move in behind the can in the pocket and remove the can from the pocket, carrying it on to the conveyor 24. It is then moved along the supporting runway 23 and discharged from the machine.

From the above it will be noted that the chamber in which the end is attached to the can is provided with two independent openings, one of which receives the cans and the other from which the cans are discharged. There is a single valve 27 which controls both of these openings. There is a conveying ring carrying devices which engage the cans, and which operates not only to remove the can from a pocket in the valve, but to convey the can to the seaming unit, and again receive the can from the seaming unit after it is closed, and place the can in the pocket in the valve so that it may be carried from the chamber. The valve is mounted wholly outside of the casing forming the chamber 3, and travels about a center which is also outside of the casing. The conveying ring carrying the pins travels about the center of the casing, but each pin passes out through one opening and then in again through the other opening. This is accomplished without in any way opening the chamber to the atmosphere, for the reason that the pin is never outside of the valve and the housing therefor. The channel in which the ring travels is formed in the bracket which supports the valve and is at all times closed by the valve.

Mounted for rotation on the main actuating sleeve 18 is a driving gear 90. This driving gear 90, shown diagrammaticaly in Fig. 10, meshes with a gear 91 mounted at the lower end of a shaft 92 which carries the discharge turret 84 associated with the seaming unit. The gear 91 also meshes with a gear 93 on a short vertical shaft carrying the gear 94 which meshes with a gear 95 attached to the shaft 46 carrying the valve 27. Also meshing with the gear 90 is a gear 96 which is attached to a shaft 97 carrying the transfer device 80 at the upper end thereof. This is the transfer device which feeds the cans to the seaming unit. Meshing with the gear 95 is a gear 98 carried by a shaft 99 and at the upper end of this shaft is a gear 100 which meshes with a gear 101 on the outer face of the conveyor ring carrying the conveying pins 70. Meshing with a gear 95' is a gear 102 carried by a shaft 103, and at the upper end of this shaft is a takeaway turret 88 associated with the valve and which removes the cans from the pockets in the valve. The gear 95' is mounted on gear 95 and turns therewith. Meshing with the gear 95 is a gear wheel 104 which carries the rotating arm 25 that places the cans in the pockets. The can placing device 87 insuring the placing of the can in the pocket after it is closed, is driven by a gear 105 which meshes with a gear on the traveling ring.

It will be noted that all of the parts which have to do with the moving of the cans are driven from this one driving gear 90. The driving gear 90 is bolted to a sleeve 106 which is mounted on the main rotating sleeve 18, but is free to move thereon. Secured to this sleeve 106 is a ring 107 which is shown in detail in Figures 16 and 17. This ring is provided with three V-shaped recesses 108 on its under face. Mounted on the sleeve 18 and rotating therewith is the upper half of the worm gear housing 109. Also mounted on this sleeve is the lower half of this worm gear housing 110. The two housings are bolted together by suitable bolts. Located within this housing is a worm gear 111 which has a threaded engagement with the sleeve 18 and which engages a worm on the shaft 112 so that it can be rotated. When it is rotated, the sleeve 18 will be raised or lowered, depending upon the direction of rotation of the worm gear, and this operates to raise or lower the upper turret which is carried by the sleeve 18.

This worm gear housing also carries three yieldingly actuated safety latch pins 113. Each latch pin is V-shape in cross section and adapted to fit the recess 108 in the ring 107. The safety latch pin is guided between vertical walls 114, 114 carried by the worm gear housing. A spring 115 surrounds the stem of the pin and bears against the shoulder thereon, normally raising said safety latch pins into engagement with the ring 107. The spring bears on the sleeve 116 which has threaded engagement with the worm gear housing, and a clamping bolt 117 serves to hold the sleeve in different set positions. When the shaft 18 is rotated, it will rotate the worm gear housing, and through the safety latch pins 113 engaging the ring 107, the driving gear 90 will be operated. If there is a jam anywhere in the machine so that one of the many moving members is stopped, it will stop the rotation of the gear 90, and when the gear 90 stops, the latch pins 113 will be forced downward by the inclined wall of the recess 108 engaging the inclined upper face of the pin, and this disconnects the pins from the ring and permits the sleeve 18 to continue its rotation.

Rotating with the sleeve 18 is a control bar 118. This control bar passes through the upper end of a rod 119, and the control bar rests on the control cam ring 120. This control cam ring is provided with a series of raised members 121 (see Fig. 18). The top of each member 121 is flat, as indicated at 122. The control bar normally rests on one of these flat faces 122. This ring is bolted to the sleeve 106 carrying the ring 107, and when the ring 107 stops, through the stopping of the gear 90, this control ring 120 will also stop. The control bar 118 turns with the ring 120, and this causes the bar to move off from the flat portion 122 and down the incline to a lower position on the control ring. This permits the rod 119 to move downward slightly. The rod 119 at its lower end is connected through a ball bearing 123 with the lever 124 which is fixed to a shaft 125. A spring 126 bearing on a pin 127 resting on the end of the lever 124 is continuously urging the rod 119 downward. The rod 119, of course, rotates with the control bar and with the sleeve 18. Attached to the shaft 125 is an arm 128 carrying a mercury switch 129 of the usual construction. The rod 119 is normally held in raised position through the pin 118 resting on the control cams. In this position the mercury switch 129 is open or in off position. When this rod 119 is permitted to move downward, the lever 124 will be swung on its pivot, and thus the mercury switch shifted to on position which establishes the circuit controlled thereby, and this brings about a stopping of the machine.

The lever 8 which shifts the clutch mechanism and stops the machine is carried by a shaft 130 (see Fig. 19). This shaft 130 carries an arm 131 at its upper end to which is attached a link 132. The link 132 is pivoted at 133 to a disk 134 mounted for rotation about a center 135. The lever 136 is attached to the disk and serves to rotate the disk in either direction. A spring 137 is pivoted to the outer end of the arm 131 and is also pivoted to a lug 138 on the frame of the machine. This spring is a tension spring and normally tends to turn the arm 131 in a clockwise direction as viewed in Fig. 4. This will move the rod 7 to the right as viewed in Fig. 2, releasing the clutch and applying the brake which is indicated at 139. When the lever 136 is turned in a counter clockwise direction, the pivot point 133 between the link 132 and the disk 134 passes a dead center line through the pivot point 135 and the point where the link is connected to the arm 131. This causes the arm to turn in a counter clockwise direction, and will shift the rod 7 so as to release the brake and apply the clutch for starting the machine. The pivot point 133 only moves a short distance beyond dead center and is stopped, so that the parts are held set with the clutch closed and the machine in operation. The machine may be stopped manually by moving the lever 136 so as to carry the pin 133 past the dead center line, after which the spring 137 will throw the parts to release the clutch and apply the brake. The disk 134 can also be moved automatically to stop the machine by a mechanism which is controlled by the mercury switch 128 referred to above. When the circuit is established in the line by the closing of the mercury switch 128, a solenoid coil 140 is energized which operates to draw in on the core 141 connected to a bell crank lever 142. The bell crank lever 142 is connected to a rod 143 mounted for movement in a bracket 144 which supports the solenoid. This rod 143 is moved to the right as viewed in Fig. 20, by a spring 145. This takes place when the solenoid is not energized, but when the solenoid is energized, then the rod is moved to the left as viewed in this figure, and the end of the rod is carried into the path of travel of the series of lugs 146 mounted on a shaft 147 which is rotating when the machine is in operation. The bracket 144 carrying the solenoid and the rod are mounted on a short shaft 148 which is journaled in a sleeve 149 carried by the frame of the machine. At the inner end of this shaft 148 is an arm 150. The arm 150 is connected to a link 151. This link 151 is pivotally connected at its other end to the disk 134 substantially at the pivot point 133 which joins the disk to the link 132. When the mercury switch is closed establishing a circuit through the core of the solenoid, the rod 144 is shifted into the path of travel of the lugs 146. The lug engaging the rod will swing the bracket carrying the solenoid, turning the shaft 148. This swings the arm 150 and through the link 151 will pull on the disk 134 so as to move the point 133 across dead center, after which the spring 137 completes the automatic shifting of the clutch lever and the stopping of the machine. The link 151 is formed in sections and is provided with a cushion spring 152 so as to take up any sudden jar and breaking of parts when the rapidly moving lug 146 engages the rod 144.

There is a second mercury switch 153 in the circuit which controls the core of the solenoid, and this mercury switch is mounted so as to be tilted by the weighted arm 154 to a closed position. Mounted on the disk 134 is a projecting arm 155. When the disk 134 is turned by the spring 137 to bring about a stopping of the machine, the arm 155 will engage a lug 156 carried by the mercury switch 153, and the switch will be tilted so as to break the circuit. When the mercury switch at the base of the machine is closed, the solenoid is energized, the rod moved into the path of the lug, and the disk 134 caused to be swung in a clockwise direction. While the disk is swinging, this arm 155 operates the mercury switch 153 to break the circuit, so that when the machine is stopped, the circuit is broken from the solenoid, and will not damage the same or waste current. Furthermore, the spring 145 will then throw the rod out of engagement with the lug and permit the bracket to be swung manually through the turning of the lever 136 and for the starting of the machine.

From the above it will be apparent that devices have been provided whereby in case of a jam at any one of the moving parts which contact with the can for passing the same into and out of the machine, this jam will release the safety latch pins, permitting the driving gear to stop, and the stopping of the driving gear brings about a shifting of the control bar, taking it off of the high points on the cam, permitting a downward movement of the control rod, and a shifting of the mercury switch at the base of the machine to establish a circuit. This energizes the solenoid at the upper end of the machine and brings about the actual stopping of the machine. After the jam is removed, all that is necessary is for the operator to shift the clutch lever which will connect up the main shaft to the actuating mechanism therefor, and this will turn the central sleeve shaft and bring the safety latch pins around into register with the notches in the ring associated with the driving gear. As soon as the pins pass into the notches and are fully seated therein, the parts are connected in proper timing for the movement of every part of the machine. There are three seaming units and there are three notches in this control ring. This turning of the safety latch pins into the notches also places the control bar on a high point on the control cam therefor, swinging the mercury switch at the base of the machine so as to break the circuit. The circuit in the mercury switch 153 swings so as to close when the machine is started.

It is believed that the operation of the machine will be clear from the detail description which has been given. The cans with the ends resting thereon or clinched thereto are passed one at a time into the valve pocket. The valve carries the can to a position opposite the opening 30 leading to the closed chamber, and a pin on the conveyor ring rising through the slot in the support engages behind the can in the pocket and positively moves the can out of the pocket, continuing the movement of the can along the support to a point where it is transferred to the seaming unit. After the can passes through the seaming unit and is closed, it is again transferred on to the table in front of a traveling pin which carries the can out through the opening 31, placing the same in a pocket in the valve. The can is fully seated in the pocket and is carried by the traveling valve away from the opening 31. An arm on the discharge turret moves into the pocket and positively removes the can therefrom, placing it on the conveyor which takes it away from the machine.

It will be noted that the one valve controls both the inlet and the outlet opening, that is, the inlet opening 30 and the outlet opening 31 leading to the closed chamber. It will also be noted that the one conveyor engages a can before it is moved from the pocket, conveys it from the pocket, and carries it all the way to the point where it is transferred to the seaming unit. This same traveling ring receives the can and places it in a pocket. By this can conveying mechanism which not only carries the can to and from the seaming unit, but out of and into the pockets of the valve, the transfer of the can from one conveying mechanism to another within the chamber is reduced to a minimum, and therefore, the jams and spilling of the contents of the can is avoided. The cans are carried into the chamber for closing and removed therefrom after they are closed, without connecting the chamber to the atmosphere, so that the chamber may be placed under vacuum, or it may be placed under gas pressure, if desired. While the seaming head has been described in detail for closing the cans by double seaming the end to the can, it will be understood that other ways may be provided for hermetically sealing the can in the chamber.

By the improved conveying mechanism which has been greatly simplified and the number of transfers of the cans reduced, jams are reduced to a minimum, but in case of a jam, at any point where the can is conveyed, in connection with any alinement of the conveying mechanism, the machine is automatically stopped, and merely upon the removing of the jam, the machine can be at once started with the parts all in proper timing. This is of great importance in connection with the arrangement of the operating parts largely within the closed chamber where they are not readily accessible without removing cover plates or parts of the machine.

It is obvious that minor changes in the details of construction and the arrangement of the parts may be made without departing from the spirit of the invention as set forth in the appended claims.

Having thus described the invention, what I claim as new and desire to secure by Letters Patent, is—

1. A can closing machine comprising a vacuum chamber, a closing unit therein, said chamber having an opening for receiving cans and an opening for discharging cans, and a single rotating pocket valve for controlling both of said openings, and traveling devices cooperating with said valve and operating in succession to place a closed can in one of the pockets of the valve and to remove a can to be closed from another pocket of the valve.

2. A can closing machine comprising a vacuum chamber, a closing unit therein, said chamber having an opening for receiving cans and an opening for discharging cans, a single rotating pocket valve for controlling both of said openings, and means moving continuously in a forward direction for removing the cans from the pockets, delivering the cans through the closing unit and for placing the cans in the pockets after they are closed.

3. A can closing machine comprising a vacuum chamber, a closing unit therein, said chamber having an opening for receiving cans and an opening for discharging cans, a single rotating pocket valve for controlling both of said openings, and traveling devices operating in succession for removing the cans from the pockets, delivering the cans to the closing unit and for placing the cans in the pockets of the valve after they have been closed.

4. A can closing machine comprising a vacuum chamber, a closing unit therein, said chamber having an opening for receiving cans and an opening for discharging cans, a single rotating pocket valve for controlling both of said openings, and traveling devices encircling the closing unit for removing the cans to be closed from the pockets and for placing the cans after they are closed in the pockets.

5. A can closing machine comprising a vacuum chamber, a closing unit therein, said chamber having an opening for receiving cans and an opening for discharging cans, a single rotating pocket valve for controlling both of said openings, traveling devices encircling the closing unit for removing the cans to be closed from the pockets and for placing the cans after they are closed in the pockets, and means for removing the cans from the traveling devices, passing the same through the closing unit, and for delivering the same to a traveling device.

6. A can closing machine, comprising a vacuum chamber, a closing unit therein, said chamber having an opening for receiving cans and an opening for discharging cans, a single rotating pocket valve for controlling both of said openings, and traveling devices operating in succession to place closed cans in a pocket for delivery and for removing cans from a pocket for closing.

7. A can closing machine comprising a vacuum chamber, a closing unit therein, said chamber having an opening for receiving cans and an opening for discharging cans, a single pocket valve located outside of the chamber for controlling both of said openings, and traveling devices for carrying the cans from the valve through the closing unit, and to the valve, said devices passing out through the discharge opening and in through the receiving opening.

8. A can closing machine comprising a vacuum chamber, a closing unit therein, said chamber having an opening for receiving cans and an opening for discharging cans, a single pocket valve located outside of the chamber for controlling both of said openings, and a traveling ring carrying a series of spaced devices for engaging and moving the cans, said devices passing out through the discharge opening for placing a closed can in a pocket, and in through the receiving opening for removing a can from a pocket.

9. A can closing machine comprising a vacuum chamber, a closing unit therein, said chamber having an opening for receiving cans and an opening for discharging cans, a pocket valve located outside of the chamber for controlling both of said openings, a traveling ring carrying a series of spaced devices for engaging and moving the cans, said devices passing out through the discharge opening for placing a closed can in a pocket, and in through the receiving opening for removing a can from a pocket, and a cam for lowering said devices beneath the valve while passing to a point radially within the pockets and for raising said devices so as to pass into, across and out of a pocket for removing the can therefrom.

10. A can closing machine comprising a vacuum chamber, a seaming mechanism within the chamber, said chamber having an opening for receiving cans, a single rotating pocket valve controlling said opening, and traveling devices moving continuously in a forward path extending across a pocket in the valve for removing a can therefrom.

11. A can closing machine comprising a vacuum chamber, a seaming mechanism within the chamber, said chamber having an opening for receiving cans, a single rotating pocket valve controlling said opening, and traveling devices moving continuously in a forward path extending across a pocket in the valve for removing a can therefrom, said path of the traveling devices encircling the seaming mechanism for carrying the cans to and from the seaming mechanism.

12. A can closing machine comprising a vacuum chamber, a closing unit therein, said chamber having an opening for receiving cans and an opening for discharging cans, a single rotating pocket valve for controlling the receiving and discharge openings and devices traveling in a circular path through the receiving opening about the closing unit, through the discharge opening beneath the valve and through and across a pocket for removing a can therefrom and delivering the same to the seaming mechanism.

13. A can closing machine comprising a frame, a casing forming a vacuum chamber having an opening for receiving cans to be closed, a seaming mechanism in said chamber, a can support in said chamber, a channel beneath said support, said support having a slot leading to the channel, a pocket valve controlling said opening, a support beneath the valve having a channel connected to the channel beneath the vacuum chamber, and a slot leading to the last named channel and extending across the path of travel of the pockets, and a circular ring rotating in said channel and having pins movable in said slot and a stationary cam for raising and lowering said pins whereby said pins are lowered to pass beneath the valve and raised to engage a can in a pocket and move the same therefrom and into the vacuum chamber to the seaming mechanism.

14. A can closing machine comprising a vacuum chamber, a seaming mechanism in said vacuum chamber, a driving gear, transfer means operated by said gear for moving cans into and out of said vacuum chamber, an operating member having a yielding clutch connection to said driving gear permitting the gear to stop in case of a jam in the can transfer means while the operating member continues to move, an electric switch operated by the relative movement of the operating member and said gear, and a stop mechanism controlled by said switch for stopping the machine.

15. A can closing machine comprising a vacuum chamber, a seaming mechanism in said vacuum chamber, a driving gear, transfer means operated by said gear for moving cans into and out of said vacuum chamber, an operating member having a yielding clutch connection to said driving gear permitting the gear to stop in case of a jam in the can transfer means while the operating member continues to move, an electric switch operated by the relative movement of the operating member and said gear, a stop mechanism controlled by said switch for stopping the machine, and a cutout switch for breaking the circuit of the control switch while the stop mechanism is in stopping position.

16. A can closing machine comprising a vacuum chamber, a seaming mechanism in said vacuum chamber, a driving gear, transfer means operated by said gear for moving cans into and out of said vacuum chamber, an operating member having a yielding clutch connection to said driving gear permitting the gear to stop in case of a jam in the can transfer means while the operating member continues to move, a control switch, a lever connected to the switch and moving the same from "off" to "on" positions, means associated with the driving gear for holding the lever with the switch in "off" position, and releasing said lever upon a relative movement between the gear and operating member, a spring for moving the lever when released, and a stop mechanism controlled by said switch for stopping the machine.

17. A can closing machine comprising a vacuum chamber, a seaming mechanism in said vacuum chamber, a driving gear, transfer means operated by said gear for moving cans into and out of said vacuum chamber, an operating member having a yielding clutch connection to said driving gear permitting the gear to stop in case of a jam in the can transfer means while the operating member continues to move, a control switch, a lever connected to the switch and moving the same from "off" to "on" positions, means associated with the driving gear for holding the lever with the switch in "off" position, and releasing said lever upon a relative movement between the gear and operating member, a spring for moving the lever when released, a stop mechanism controlled by said switch for stopping the machine, and a cutout switch for breaking the circuit of the control switch while the stop mechanism is in stopping position.

ALFRED L. KRONQUEST.